United States Patent
Mracek

(10) Patent No.: US 7,866,734 B2
(45) Date of Patent: Jan. 11, 2011

(54) INFLATABLE SHAPING SYSTEM REDUCING THE AERODYNAMIC DRAG UPON THE REAR OF A VEHICLE

(76) Inventor: Milo F. Mracek, 22 Morwood La., Creve Couer, MO (US) 63141

( * ) Notice: Subject to any disclaimer, the term of this patent is extended or adjusted under 35 U.S.C. 154(b) by 0 days.

(21) Appl. No.: 12/693,094

(22) Filed: Jan. 25, 2010

(65) Prior Publication Data

US 2010/0231001 A1    Sep. 16, 2010

Related U.S. Application Data

(60) Provisional application No. 61/209,913, filed on Mar. 13, 2009.

(51) Int. Cl.
*B62D 37/02* (2006.01)
(52) U.S. Cl. ........... 296/180.4; 296/180.1; 296/181.5
(58) Field of Classification Search ........... 296/180.1, 296/180.2, 180.3, 180.4, 180.5, 181.5
See application file for complete search history.

(56) References Cited

U.S. PATENT DOCUMENTS

| | | | | |
|---|---|---|---|---|
| 2,737,411 A | * | 3/1956 | Potter | 296/180.4 |
| 4,553,781 A | * | 11/1985 | Johnson | 296/180.4 |
| 4,601,508 A | * | 7/1986 | Kerian | 296/180.4 |
| 4,702,509 A | * | 10/1987 | Elliott, Sr | 296/180.4 |
| 5,058,945 A | * | 10/1991 | Elliott et al. | 296/180.5 |
| 5,375,903 A | * | 12/1994 | Lechner | 296/180.1 |
| 5,823,610 A | * | 10/1998 | Ryan et al. | 296/180.4 |
| 6,321,659 B1 | * | 11/2001 | Gelbert et al. | 296/180.1 |
| 6,409,252 B1 | * | 6/2002 | Andrus | 296/180.4 |
| 6,457,766 B1 | * | 10/2002 | Telnack | 296/180.4 |
| 6,467,833 B1 | * | 10/2002 | Travers | 296/180.4 |
| 6,742,616 B2 | * | 6/2004 | Leban | 296/180.4 |
| 6,789,839 B1 | * | 9/2004 | Samuelson | 296/180.4 |
| 7,055,891 B2 | * | 6/2006 | Jungert | 296/180.5 |
| 7,147,270 B1 | * | 12/2006 | Andrus et al. | 296/180.5 |

* cited by examiner

*Primary Examiner*—Lori L Lyjak
(74) *Attorney, Agent, or Firm*—Charles McCloskey

(57) ABSTRACT

An inflatable shaping system has a frame, rectangular with four sides, similar to the rear of a trailer or truck. The frame has a hinged connection and swings from an over-the-road configuration and to a deflated stowed position against the side of the trailer. Upon the frame, the system has an inflatable body and a durable skin covering the frame and the inflatable body. The inflatable body has a continuous attachment to the frame. The inflatable body has at least one inflatable element connected by a flexible adhesive or device. The inflatable elements remain contained between the frame and the durable skin, generally outwardly from the trailer. In communication with the inflatable elements, a pump system supplies air for their inflation and removes air for their deflation. The pump system operates remotely in the vicinity of the truck.

9 Claims, 10 Drawing Sheets

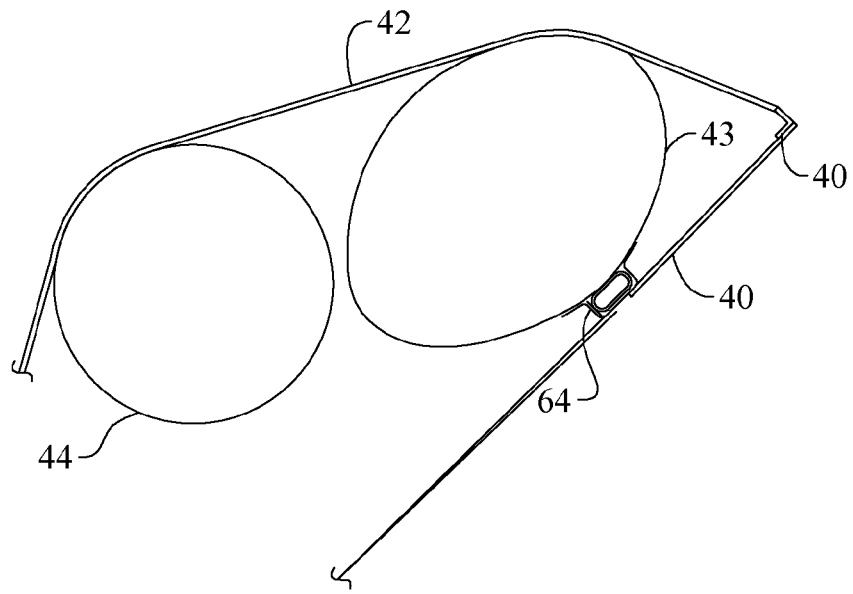
Fig. 16
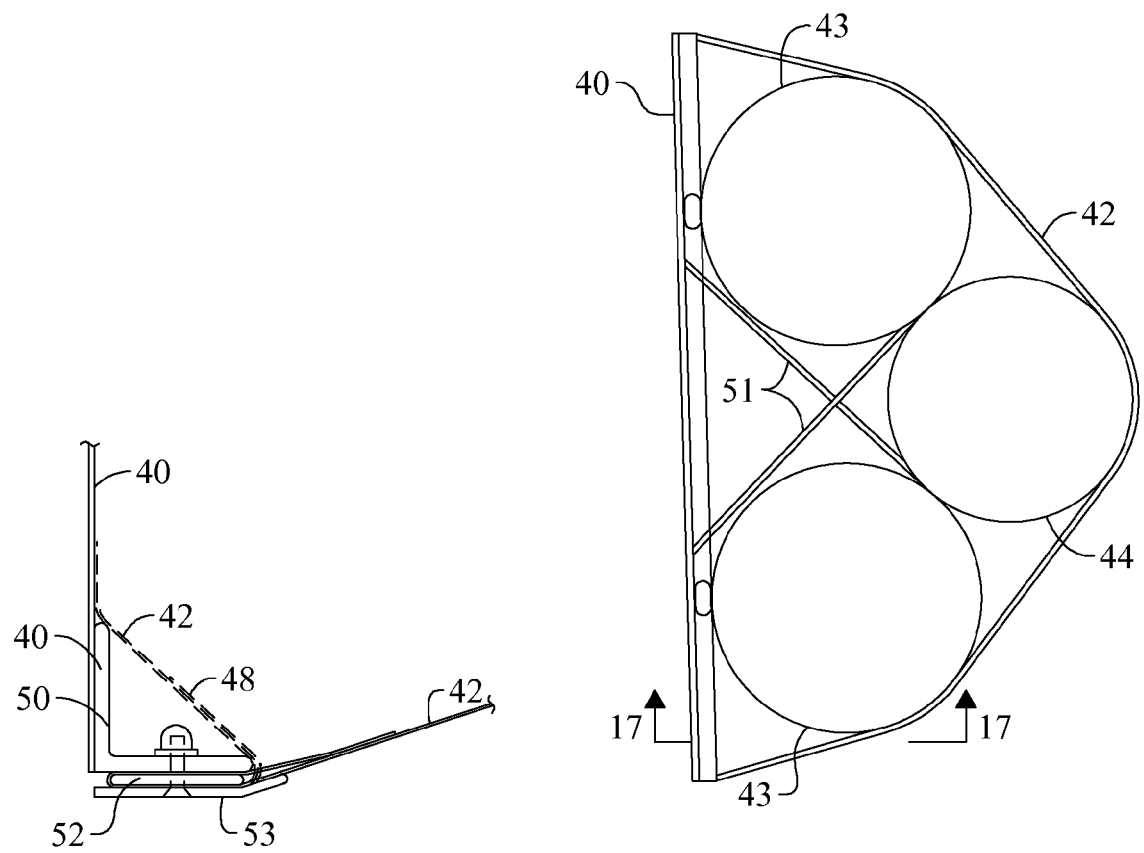
Fig. 17
Fig. 15

US 7,866,734 B2

INFLATABLE SHAPING SYSTEM REDUCING THE AERODYNAMIC DRAG UPON THE REAR OF A VEHICLE

CROSS REFERENCE TO RELATED APPLICATION

This non-provisional application claims priority to the provisional application Ser. No. 61/209,913 filed Mar. 13, 2009 which is commonly owned by the same inventor.

BACKGROUND OF THE INVENTION

The inflatable shaping system reducing the aerodynamic drag upon the rear of a vehicle generally relates to drag reduction devices and more specifically to an inflatable and deflatable device that alters the shape of the rear of a trailer or truck. The present invention reduces the aerodynamic drag caused by the blunt rear ends of over-the-road semi trucks and trailers. The present invention utilizes inflatable members that stretch a covering upon the rear of a trailer which alters the shape of the trailer encountered by air flow during motion. The altered shape of the trailer lessens drag and improves fuel mileage for is trailers and trucks.

Various goods, commodities, and equipment move around the country by truck. Trucking moves goods and cargo from a loading destination to an unloading destination over roads and highways nationwide. The unloading destination often includes a specific address to a door, a dock, or a building. Unlike other modes of freight, trucking allows for point to point movement and delivery. In recent decades, manufacturing has moved closer to a just in time inventory model where parts and goods arrive at a factory within hours of their assembly into a finished good. Trucking with its timely and precise delivery has brought about just in time inventory now prevalent in manufacturing.

Trucking utilizes tractors and trailers, and for smaller loads, trucks without trailers. Tractor and trailers also have the name of semi-trailer or semi. A tractor trailer travels with the tractor in the lead. Motion of the tractor trailer generates a flow of air about the tractor and its trailer. The tractor often has a short front about six feet tall over the engine and ahead of the windshield. At the windshield and rearward, the tractor has its maximum height of approximately ten feet. The air encounters the leading edge of the truck, the engine, and flow over the engine to the windshield. There, the air flow changes direction and flows upwardly to the top of the truck, generally the cab.

Behind the cab, the tractor trailer has its trailer. The trailer has a height of approximately twelve feet with a few feet exposed above the cab. The trailer has its front proximate the cab and its rear generally away from the cab. When the tractor trailer moves forward, the air flow once more changes direction from over the cab to upwardly at the front of the trailer and then flat over the trailer. At the end of the trailer, the air flow then drops downwardly and curves inwardly behind the rear of the trailer. When the air flow drops, it creates an eddy region behind the rear of the trailer. The eddy region disrupts the air flow after the tractor trailer is making the flow less than laminar. The disrupted air flow causes turbulence behind the rear of the trailer which slows the speed of the tractor trailer as a drag force. The driver of the tractor trailer compensates for this by additional throttle upon the engine. The additional throttle raises fuel consumption for the tractor. Though this background material refers to a tractor trailer, the flow of air over the engine and cab of a truck without trailer has much in common.

DESCRIPTION OF THE PRIOR ART

For a few years now, tractors of tractor trailers and trucks with vans or panels, have sought to improve fuel mileage in various ways often by lessening drag. Tractors have had shaped hoods and foils placed upon the roofs of cabs as a smoother transition for air flow from the cab up and over the trailer. The hoods and foils generally have permanent shapes and installations upon the roofs of tractors and trucks. The hoods and foils make the step in height from cab to trailer smoother and generally along a curved flow path from the lower elevation of the cab to the top of the trailer. The hoods and foils improve the aerodynamic performance of tractors and trucks upon the front. However, few hoods and foils have seen use on the rear of a trailer or truck. Further, the rear of a trailer generally opens and closes when loading and unloading cargo. Placing a permanent hood upon the rear of a trailer interferes with opening and closing the trailer during cargo handling.

The present invention overcomes the disadvantages of the prior art and provides a inflatable shaping system that lessens drag upon the rear of a trailer or van of a truck yet permits ready access to the rear of the trailer for loading and unloading of cargo. The present invention also stows compactly when not in use, swings out of the way of cargo handling equipment, and remotely operates upon command of the driver. The present invention readily installs upon existing trailers, vans, and panel bodies of trucks.

SUMMARY OF THE INVENTION

Generally, the inflatable shaping system has a structural frame, rectangular with four sides, approximately the same size, height and width as the rear of a trailer, truck, or cargo box. The frame has a hinged connection on one of the vertical sides, and swings similar to a gate, from a deflated over-the-road configuration and to a deflated stowed position against the side of the truck or trailer. The frame secures firmly in the deployed and stowed positions. The frame has structurally sound locks, latches, and hinges that require no tools for their operation. Upon the frame, the system has an inflatable body and the frame has a durable skin that completely covers the frame and the inflatable body. The inflatable body has a continuous mechanical attachment to the edges of the frame, on its four sides. The preferred embodiment of the inflatable body has at least one inflatable element that attaches by a flexible adhesive or mechanical means to the rigid frame. The inflatable body also includes an overlay of a thin flexible skin attached continuously to the perimeter of the structural frame. The overlaid skin has a construction of a strong tightly woven, highly flexible material, such as "Rip Stop" nylon, impregnated with materials such as nylon, vinyl, silicone, urethane, or neoprene. The inflatable elements remain contained between the frame and the overlaid skin, generally outwardly from a trailer or truck. As the inflatable elements fill with air, they apply tension to the overlaid skin and force it into a predetermined aerodynamic shape.

The inflatable elements have a construction from a leak proof flexible material that has a very low percentage of elongation under load. The inflatable elements behave similar to the overlaid skin material which provides a rigid predictable shape to the system when deployed. Following complete inflation, is higher internal pressures make the inflatable element more rigid but not larger.

The use of multiple inflatable elements with the overlaid skin minimizes large stress loads endured by the structural frame. The internal pressure loads are reacted by hoop tension within the inflatable member, not by bearing upon the structure of the rigid frame. The frame endures the bearing loads, imparted to the overlaid skin, where attached to the frame around its perimeter where most structurally efficient. This position of the inflatable elements together with the controlled load paths leads to significant overall weight reduction of the present invention. Saving weight minimizes the additional dead load added to the tractor trailer weight thus reducing the adverse effects of deploying this invention upon a trailer. The present invention at its low weight improves the fuel efficiency and tonnage per mile of a trailer or enclosed cargo truck.

An additional advantage of this invention is the combination of the multiple inflatable elements and overlaid skin that reduces the inflatable volume required to obtain the body shape. The present invention also provides a simple and convenient stowing method. Stowing occurs by swinging the structural frame together with the attached evacuated body assembly from the over-the-road position to the stowed position. Stowing occurs by unlatching and swinging the frame through approximately 270° until tight against the side of the trailer, or vehicle, and latching it. In the stowed position, the inflatable body remains evacuated and the frame and the side of the vehicle contain the deflated body and protect it beneath the structural skin of the frame. The stowed configuration protrudes from the side of the truck or trailer only the thickness of the frame. The inflatable body, in its evacuated state, has protection from the frame and stays out of the way from normal operations of the truck, such as loading and unloading. In addition, the present invention does not interfere with backing of a truck or trailer into a loading dock when in the stowed configuration. This unique is stowed configuration allows the truck to travel from stop to stop locally while remaining in its stowed position until necessary for its primary usage: high speed long haul trips.

The present invention also includes a remotely operated air pump package with flexible supply lines permanently connected to the inflatable elements. The pump package inflates or deflates while regulating the desired pressure of the system. The evacuated body becomes as thin as the materials of its construction which allows a truck or trailer to travel in congested areas, and then to remotely inflate the body when on the open road, by the push of a button even when moving. This invention also allows the driver to remotely inflate or deflate the body prior to arriving at his unloading or loading destination while driving. The invention also eliminates the time required for inflation or deflation of the body from the operational time requirement of other inflatable body shaping systems. In the prior art, this required time has served as an undesirable drawback to large inflatable systems.

The preferred embodiment of this invention includes a double hinge configuration that allows the entire body structure to swing from a deployed position to a stowed position while simultaneously clearing the rear end of the truck or trailer. In the stowed position, the body does not interfere with normal operational requirements of the vehicle driver. The present invention readily adapts to existing trucks and trailers, including those with roll up or hinged rear loading doors.

There has thus been outlined, rather broadly, the more important features of the invention in order that the detailed description thereof that follows may be better understood and that the present contribution to the art may be better appreciated. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

It is therefore the object of the present invention to provide a inflatable shaping system that has a combination of the multiple inflatable elements and overlaid skin that reduces the volume occupied to obtain the body shape.

Another object of the inflatable shaping system is to provide a simple and convenient stowage method.

Another object of the inflatable shaping system is to utilize the least amount of time, labor, and tools during installation and usage upon a vehicle whether moving or at rest.

Another object the inflatable shaping system is to provide such a system that has a low cost of manufacturing so the purchasing organizations can readily purchase it through stores and supply sources.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings,

FIG. 15 is a sectional view through present invention when inflated along the plane indicated by line 15-15 of FIG. 14;

FIG. 16 is a sectional view through the inflated body along a plane indicated by diagonal line 16-16 of FIG. 14;

FIG. 17 is a sectional view through the inflated body along a plane indicated by line 17-17 of FIG. 15; and, FIG. 18 is a view same as FIG. 14 with cover skin removed, at a smaller scale.

The same reference numerals refer to the same parts throughout the various figures.

DESCRIPTION OF THE PREFERRED EMBODIMENT

Figure 1:
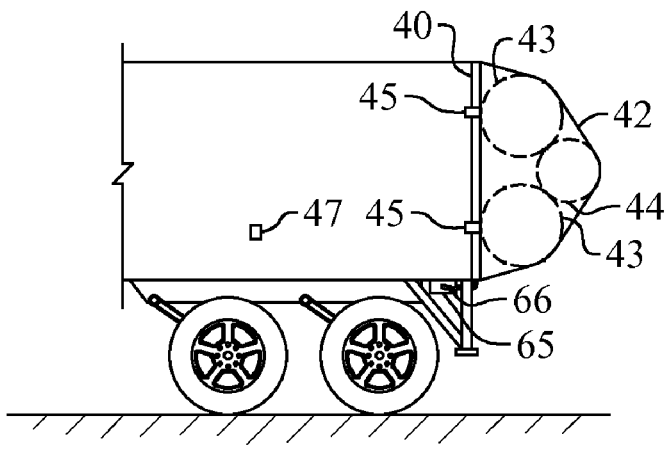
FIG. 1 is a side view of a trailer having the present invention installed and deployed thereon.

The present art overcomes the prior art limitations by providing a inflatable shaping system, as in FIG. 1 that overcomes the limitations of prior is devices and methods for reducing drag upon the rear of trailers or self propelled vans or trucks with cargo boxes. Referring to FIGS. 1-18:

40 generally denotes a structural rigid frame assembly for the preferred embodiment of the present invention.

42 is an externally tensioned cover skin, or flexible member, that forms the deployed aerodynamic after body shape.

43 denotes the base inflatable element, or major element, of this preferred embodiment. It has a shape formed of four intersecting cylinders having mitered corners that form a square shape in plan view, later shown in FIG. 18. The inflatable element is made of strong, flexible, leak proof material, such as nylon and the like.

44 is a second inflatable element, or minor element, spherical in shape when inflated. Elements 43, 44 are flexibly bonded to one another to insure position control. Elements 43, 44 are also bonded in like manner to cover skin 42 at their mutual contact areas. Base inflatable element 43 is also attached to the structural cross beams of frame 40 so as to control the contact areas of element 43. An embodiment of this attachment, shown in FIG. 16, requires multiple attachments of this type.

45 denotes a hinge assembly attachment mechanism, at least one in the preferred embodiment.

46 denotes the attachment and locking point of frame 40 in the stowed position or configuration.

47 denotes the latch and lock mechanism of frame 40 when in the over-the-road position or locked configuration or deployed position, later shown in FIG. 12.

Figure 3:
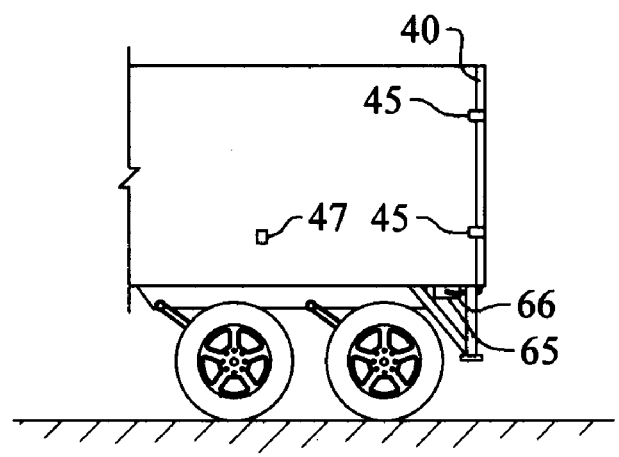
FIG. 3 is a side view of a trailer with the present invention being evacuated and secured to the rear of the trailer.

48 designates the inflatable after body in its deflated condition, locating against the structural frame 40 as shown in FIG. 3.

49 denotes the structural skin that covers the side of frame 40 opposite the inflatable after body.

50 denotes the framing angles, or cross beams, that form the structure of the rigid frame of the preferred embodiment of the present invention.

Figure 14:
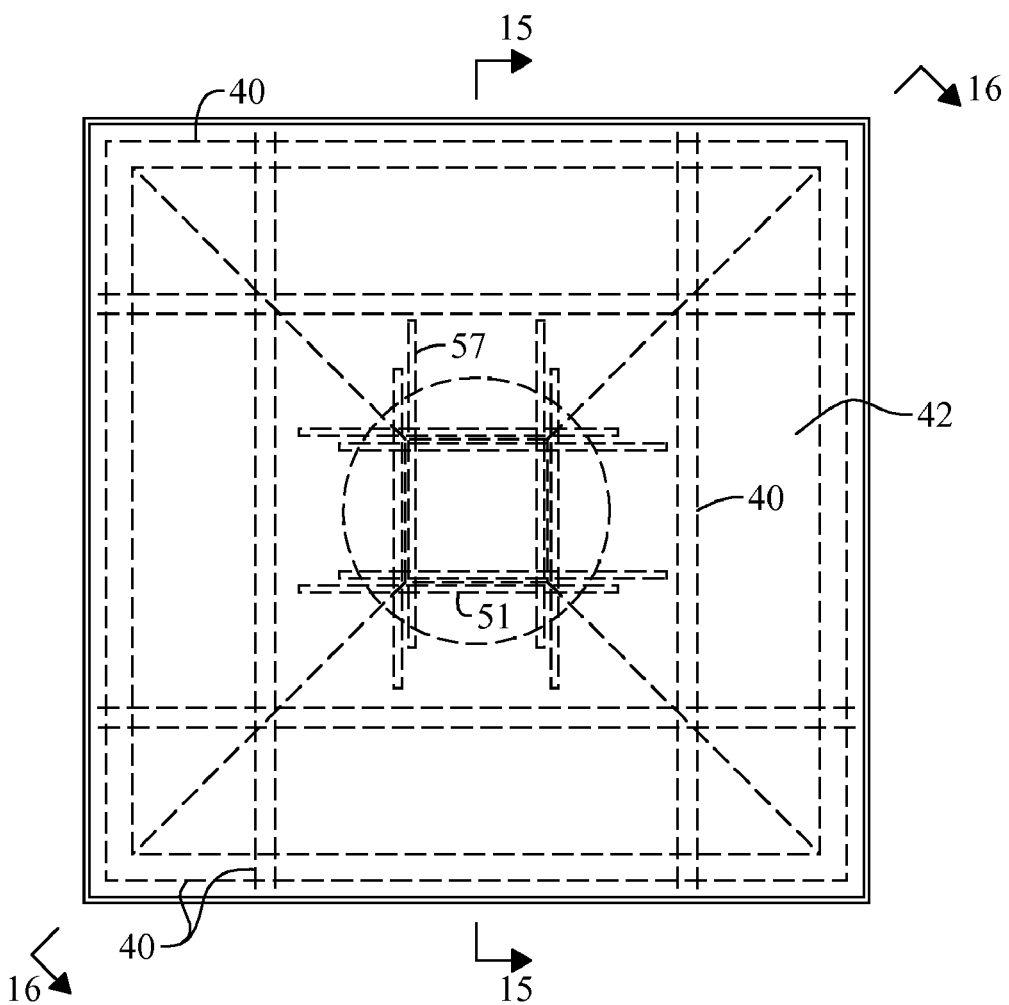
FIG. 14 is a rear view of the body shaping elements with the structural frame shown in phantom of the present invention.

51 denotes the elastic members that guide the inflatable elements and the flexible cover skin to a controlled position during inflation or deflation of the invention as shown in FIGS. 14, 15.

52 denotes a rigid, flat, structural bar contained in a pocket built into the edge of the tensionable cover skin to provide a continuous attachment of the framing member of frame assembly 40. This arrangement also removes any stress concentrations of the attachment's fasteners at the holes, as shown in FIG. 17.

53 denotes a clamping strip that clamps the cover skin to the frame member 50, even when the cover is under tension. This strip also protects the deflated after body from rubbing against the side of the vehicle, usually a trailer, when in the stowed position.

54 denotes the fitting part of the latching assembly 47 attached to structural frame 40. Fitting 47 has three functions: a) guiding the frame into position, b) supporting the weight of the frame assembly and after body while in the over-the road, that is, deployed position, and c) containing the latching tab half of the locking and draw-up mechanism. This fitting 54 contains a lug used to lock the hinged frame assembly in the stowed position against the side of the trailer.

55 denotes the portion of the latch assembly 47 attached to the trailer body and providing the guide posts for the tab of fitting 54. These posts provide the structural vertical load capacity of the assembly.

56 denotes where the latch and locking mechanism mates with the tab of fitting 54. The double acting hinge and support assembly appears in FIGS. 9, 11 in both the deployed or over-the-road configuration and the stowed configuration.

57 denotes the first hinge pin that functions through the first 90° of the frame, or gate, structure's motion.

58 denotes the second hinge pin that rotates the frame 40 about a rotation point for the next 180° of motion. At the same time, link 59 rotates the additional 180° and positions the frame 40 forward with respect to the rear of the trailer, placing it so as not to interfere with the loading and unloading of the trailer.

60 denotes the structural lug attachment of hinge link 59 to the trailer body.

Figure 9:
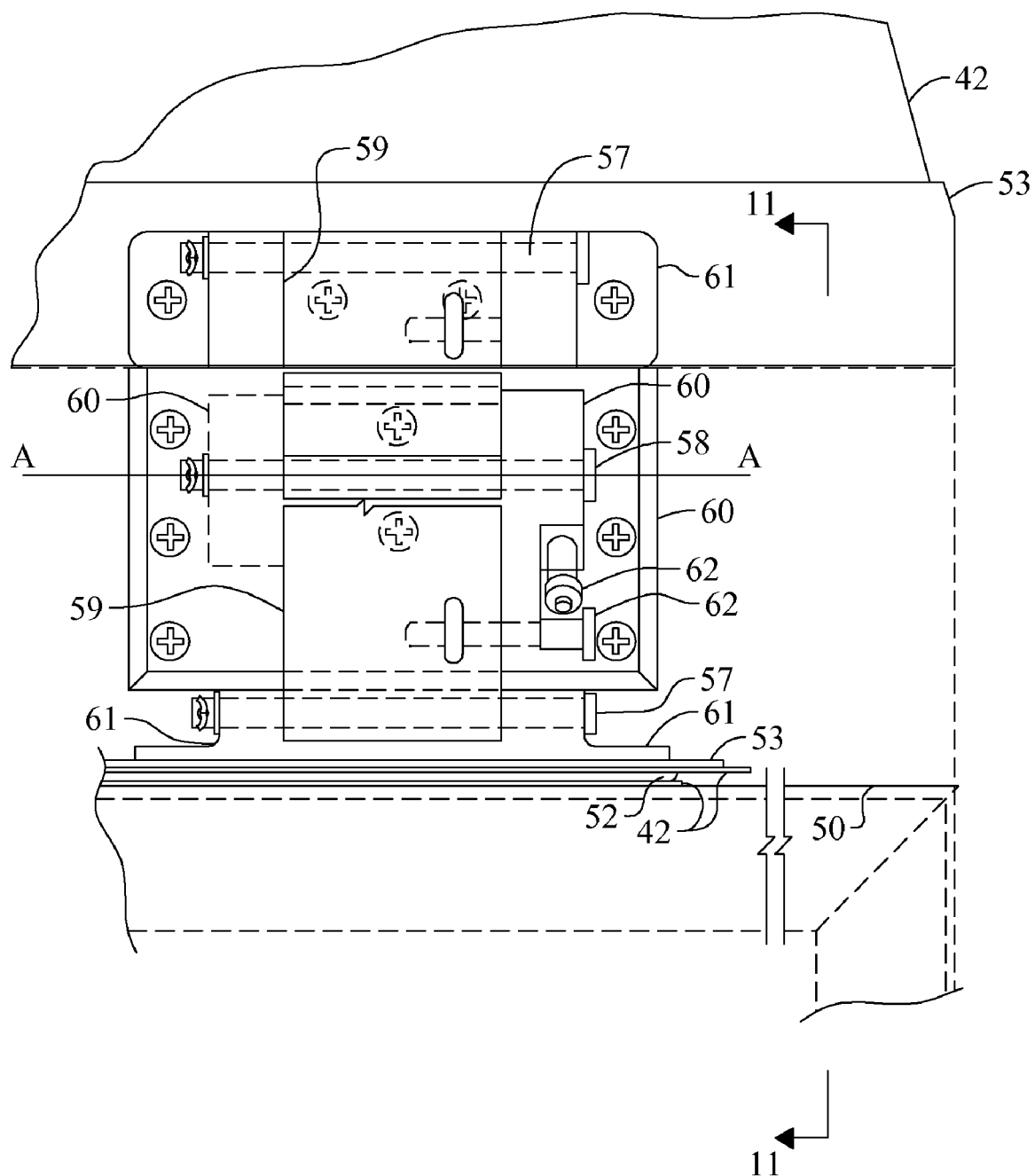
FIG. 9 is a detail view of the double acting hinge attachment of the frame of the present invention that attaches it to the body of the trailer.
Figure 11:
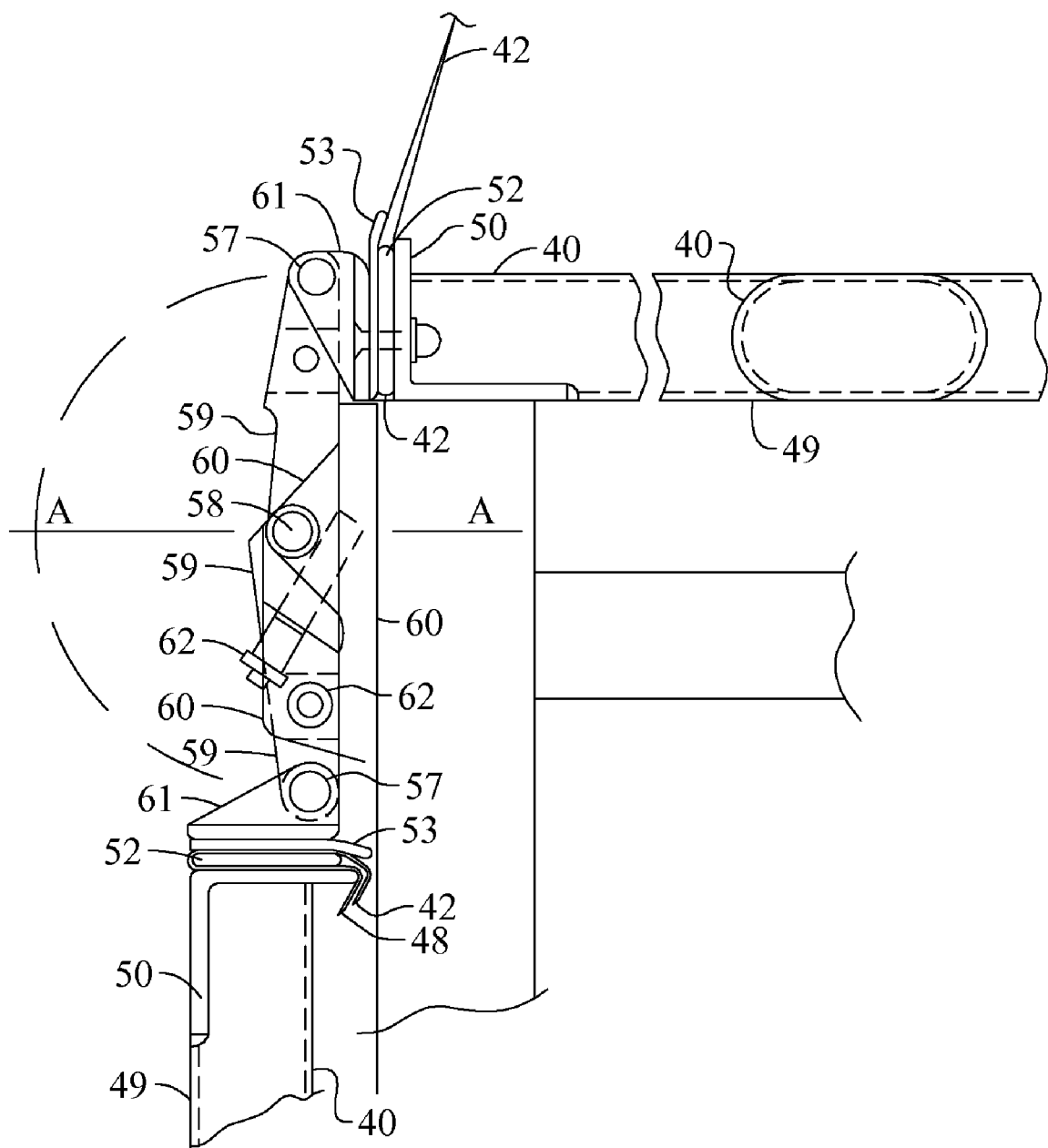
FIG. 11 is a side view of the double acting hinge attachment of the frame of the present invention.

61 denotes the first pivotal hinge pin lug attachment fitting to the frame assembly in FIGS. 9, 11.

62 denotes a quick release locking pin, shown in the locking position through fitting 60 and hinge link 59. In addition, FIGS. 9, 11 show the quick release locking pin in a stowed location within fitting 59.

Figure 13:
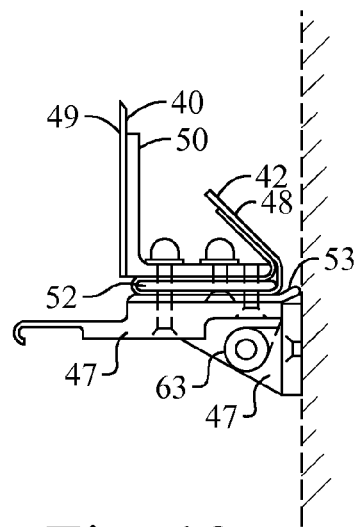
FIG. 13 is a side view of the frame of the present invention attached to the side of the trailer in the stowed configuration.

63 denotes a quick release locking pin that secures the frame assembly in the stowed position against the side of the trailer in FIG. 13.

64 denotes the attachment of element 43 to the cross beams of frame structure assembly 40. These attachments are preferably fixed as shown in FIG. 16 or alternatively the attachments are flexible.

Figure 2:
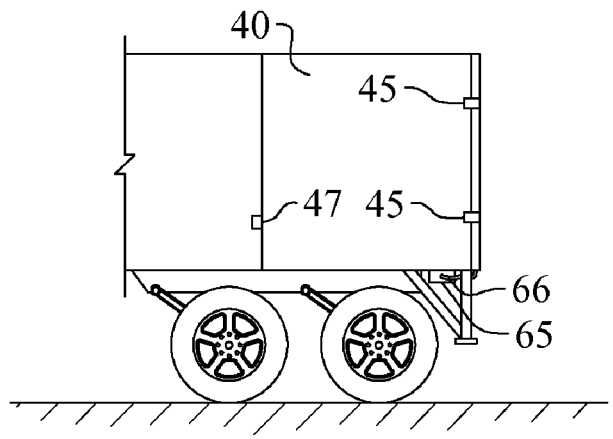
FIG. 2 is a side view of a trailer with the present invention evacuated and stowed against the side of the trailer.

65 in FIGS. 1, 2, 3 denotes a pressurization, or pump, system powered electrically from the vehicle's battery or alternatively pneumatically from the vehicle's compressed air system. This pump system inflates the inflatable elements to a pre-set pressure and automatically maintains it within set parameters, approximately 0.5 psi to 4 psi above atmospheric pressure. The pump system utilizes a pressure regulator for such automatic pressure maintenance. The pump system also deflates and maintains the deflated state of the inflatable elements for stowage. All of the functions operate by remote controls accessed by the vehicle operator from anywhere in the immediate vicinity of the vehicle with the invention installed thereon. The remote controls for the invention preferably operate upon wireless electronics.

And, 66 denotes a permanently attached flexible air line that moves freely from the deployed to the stowed positions of the inflatable after body shaping structure of the present invention.

Having described the components of the invention briefly, FIG. 1 provides a side view of the preferred embodiment of the inflated after body shaping invention in the over-the-road configuration made according to the principles and teachings of the present invention. This figure shows a preferred location of the pump system as at 65 and 66.

Figure 1A:
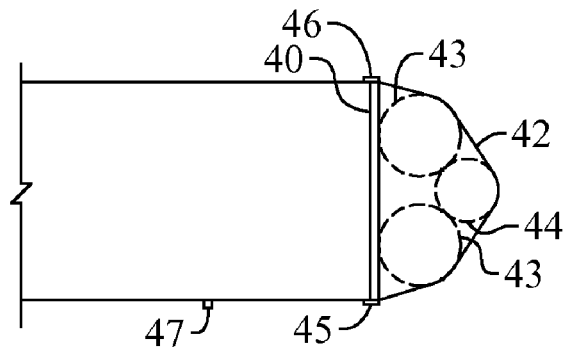
FIG. 1a is a top view of a trailer with the present invention installed.

FIG. 1A then shows a top view of the preferred embodiment upon a vehicle, such as a trailer, generally at the rear of the vehicle. This figure shows the invention in the deployed position, that is, expanded outwardly from the vehicle thus altering the shape of the vehicle into a more aerodynamic form. When deployed, the invention has a thickness away from the vehicle of less than five feet, within the regulations.

Figure 1B:
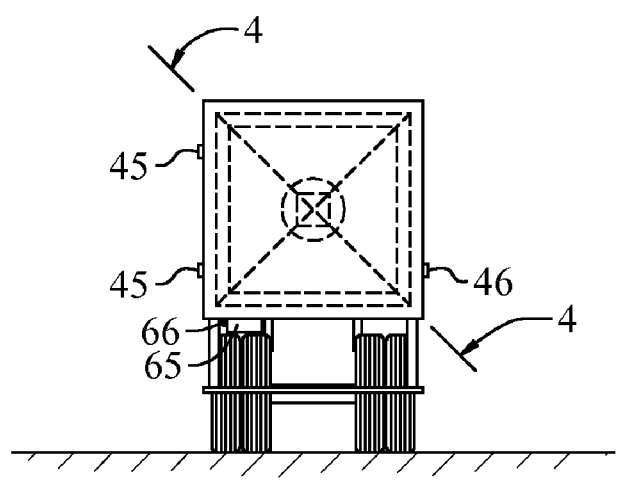
FIG. 1b is a rear view of a trailer with the present invention in the foreground.

FIG. 1B shows a rear view of the present invention upon a vehicle when deployed, that is in the over the road configuration. This figure also provides a preferred location of the pump system 65, 66 upon the vehicle.

FIG. 2 is a side view of the present invention when deflated but with the remainder of the invention secured to the rear of a trailer as in the over the road, or deployed configuration. As shown, deflating the invention and leaving it to cover the rear of the trailer provides an intermediate configuration, activated by remote control by a driver while en route to a loading or unloading location. The controls of the present invention include a relay, or other switchgear, that prevent unintended inflation of the element when the frame is stowed, parallel to the trailer. Deflating the present invention while in motion eliminates the inconvenience and down time as shown in the prior art that calls for installation and removal of prior art devices at a loading site before and after loading while the trailer remains stationary. Where minutes and fractions of an hour make a difference to productivity of a trucker, the present invention provides an advance over the prior art.

Figure 2A:
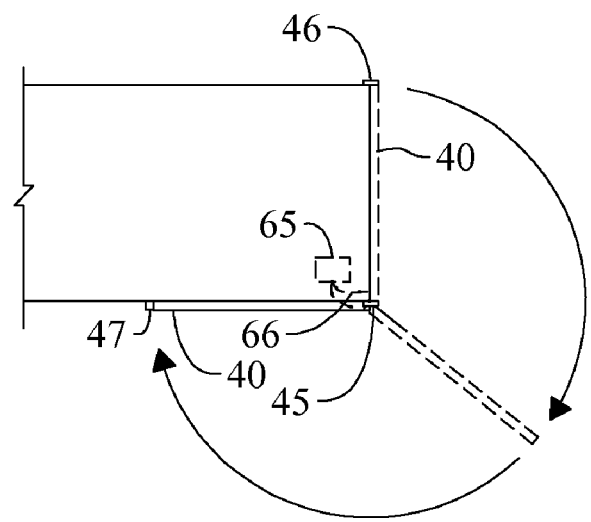
FIG. 2a is a top view of a trailer with the present invention stowed thereon.

Next, FIG. 2A shows a top view of the present invention when deflated. After deflation, the skin and inflatable elements contract upon the frame and a driver swings the frame outwardly from the door. The frame has a hinged connection upon the side of the trailer so that the frame swings clear of the rear trailer doors and flush upon the side of a trailer.

Figure 2B:
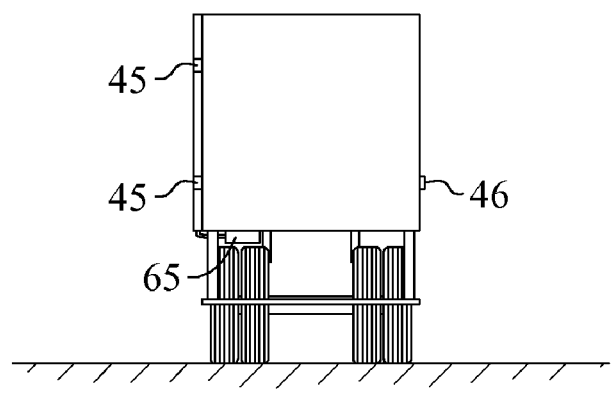
FIG. 2b is a rear view of a trailer with the present invention folded to the left of the figure.

FIG. 2B illustrates a rear view of a trailer where the present invention has been deflated and stowed against the side of the trailer. As above, when deflated the present invention compresses upon the frame and the frame swings outwardly and away from the trailer doors and rotates upon hinges so that the frame attains a flush and parallel orientation to the side of the trailer. Beneath the trailer, the present invention has the inflation system installed for use by a driver remotely from the vehicle. The driver can stand away from a trailer or sit in a cab to operate the inflation and deflation of the invention.

FIG. 3 shows a side view of the present invention when deflated and still locked in the over-the-road traveling configuration. This configuration also shows an alternate intermediate configuration that a driver may remotely operate prior to arriving at a loading point. With this unique ability, the present invention is eliminates the inconvenience and time lost as in the prior art devices that required deflation and securement at the loading site, with the trailer motionless, both prior to loading and after loading.

Figure 3A:
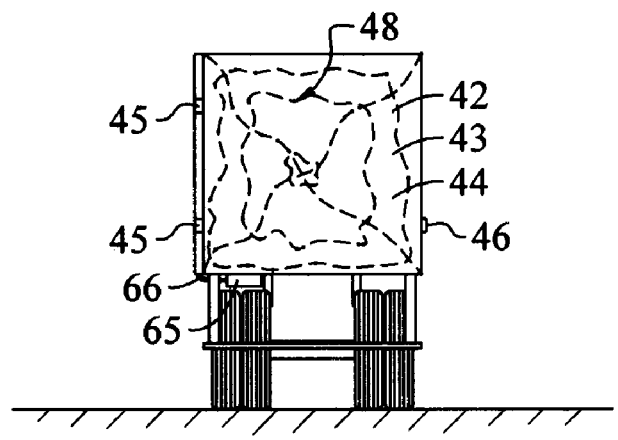
FIG. 3a shows a rear view of the trailer with the evacuated present invention thereon.

Looking at the rear of a trailer, FIG. 3A shows a rear view of the present invention when deflated. This view further illustrates the cover skin—a thin flexible material—being drawn tightly against the frame of the present invention as atmospheric pressure compresses the cover skin and inflatable member when deflated.

Figure 4:
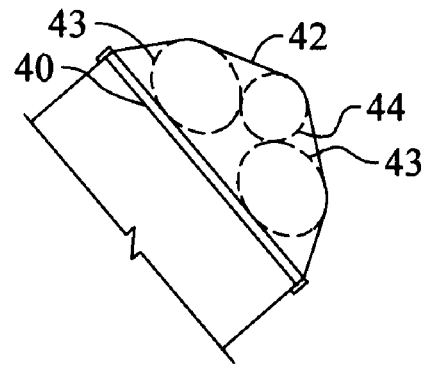
FIG. 4 is a sectional view of the inflated elements of the present invention along the plane indicated by the line 4-4 in FIG. 1b.

Next, FIG. 4 is a sectional view of the inflated elements, along the plane defined by the line 4-4 of FIG. 1 where the elements have attained an inflated configuration. Mounted upon the frame, inflatable elements, 43, 44, when pressurized by the pump system put the overlying cover skin 42 into tension. The tension upon the cover skin 42 urges the cover skin into the desired shape of the present invention.

Figure 5:
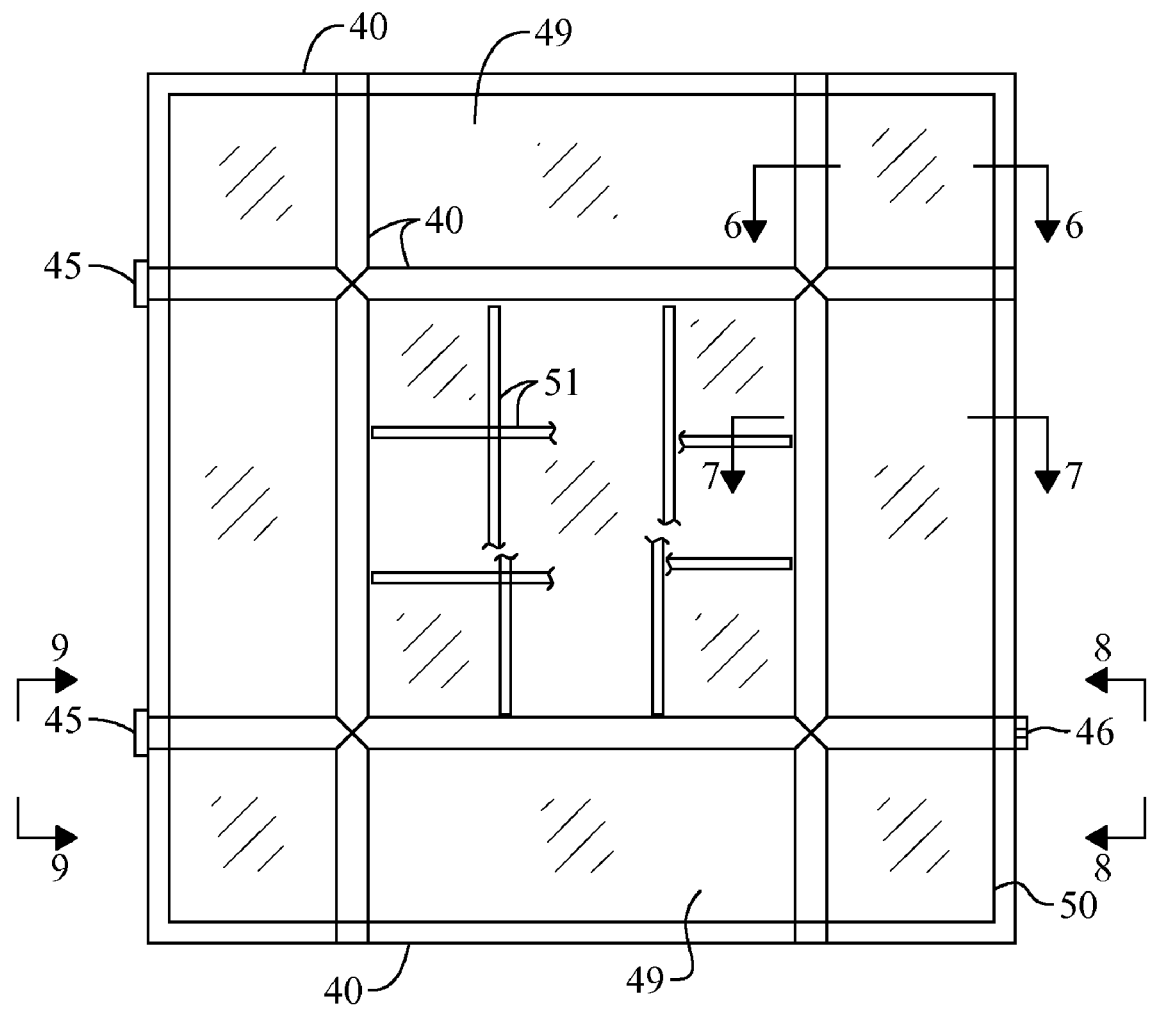
FIG. 5 is a plan view of the frame of the present invention to which the inflatable body attaches.

Beneath the inflatable members and the cover skin, FIG. 5 shows a plan view drawing of the structural frame, or gate, to which the inflatable body attaches. The frame has a generally rectangular shape proportional to the rear end of a vehicle, generally a trailer.

Figure 6:
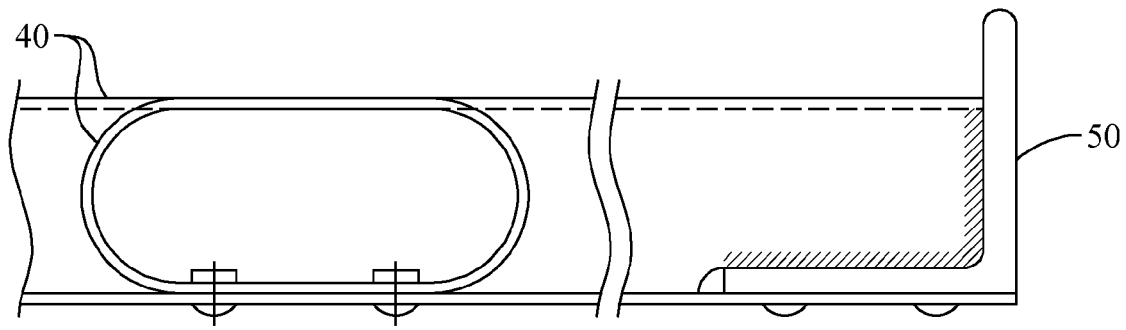
FIG. 6 is a sectional view of constructing the cross beams and the outer edging angle and the attached skin of the present invention.

Then FIG. 6 is a close up sectional view that illustrates a preferred method of construction for the cross beams, the outer edging angle, and the attached skin when they assemble to form the structural frame.

Figure 7:
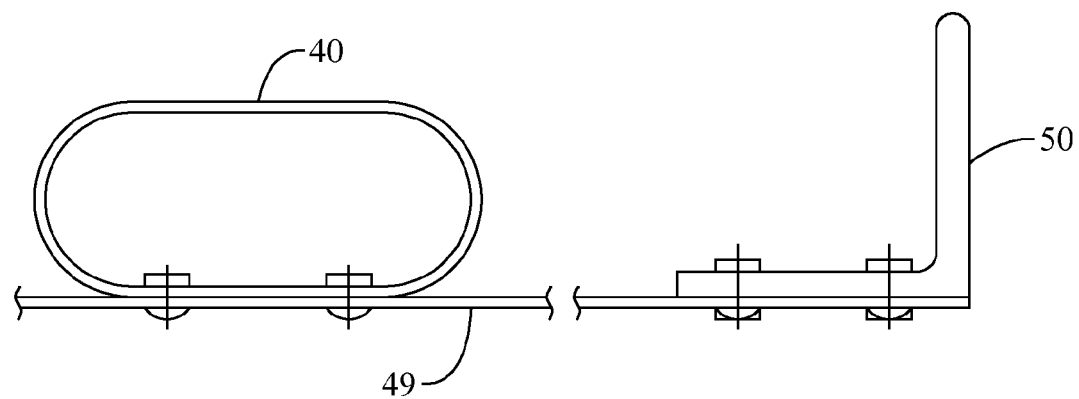
FIG. 7 is a sectional view between cross beams showing attachments of the structural skin, beams and edging angle of the present invention.

Moving along the structural frame, FIG. 7 provides a close up sectional view between two cross beams that shows the attachment of the cover skin, beams, and edging angle of the frame.

Figure 8:
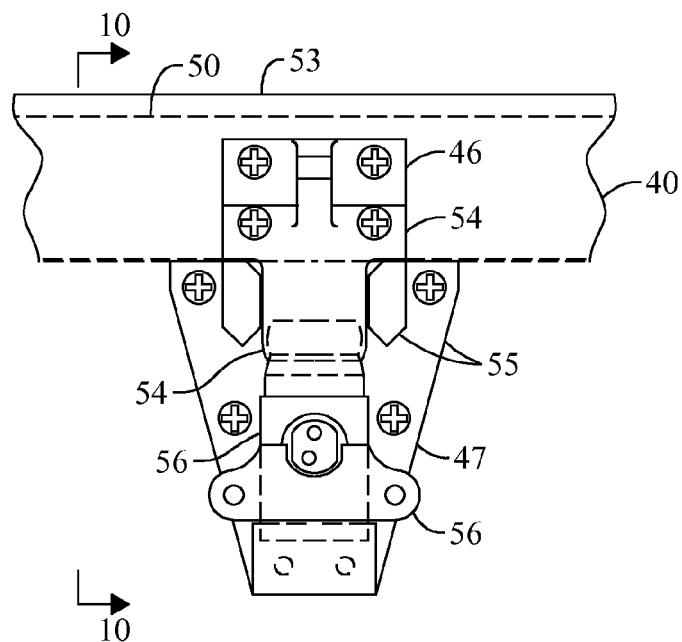
FIG. 8 is a detail view of the latch and locking mechanism of the frame of the present invention.

Moving outwardly from the structural frame, FIG. 8 describes a front view of a latch and its locking mechanism. This view shows the preferred latch and locking mechanism that attaches the frame to the body of the trailer in the latched configuration and the over-the-road configuration.

Back to FIG. 9, it shows a front view of a double acting hinge attachment mechanism that connects the structural frame to the body of the trailer, in the latched, or stowed, configuration and the over-the-road configuration. In this figure, the portion above the line designated A-A, represents the double acting hinge in the over-the-road configuration. While, the portion of the view below the line designated by A-A represents the double acting hinge when the frame is stowed against the side of the trailer in the stowed configuration, that is for loading and unloading at a shipping point.

Figure 10:
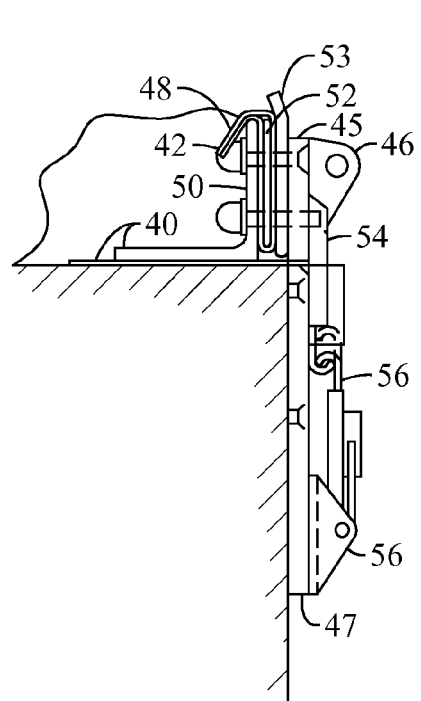
FIG. 10 is a side view of the locking latch mechanism shown in FIG. 8.

FIG. 10 is a side view of the locking latch mechanism previously shown in FIG. 8. This view shows the mechanism in the attached and locked position.

FIG. 11 provides another side view, this one of the double acting hinge attachment mechanism showing both over-the-road configuration towards the upper right and the stowed configuration towards the lower left.

Figure 12:
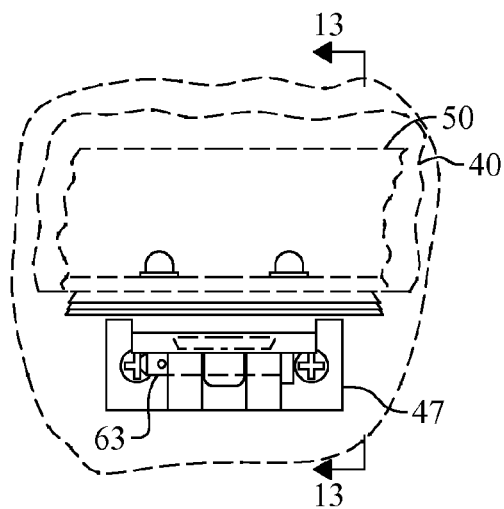
FIG. 12 is a detail view of the frame when attached and locked against the side of the trailer in the stowed position.

Back to FIG. 12, FIG. 12 provides a front view of the frame at a hinge mechanism where the frame is placed against the side of the trailer in the stowed configuration.

FIG. 13 is a side view of the frame attachment to the side of the trailer in the stowed configuration. This figure is a side view of the structure previously shown in FIG. 12.

Moving forward to FIG. 14, FIG. 14 is a rear view of the invention deployed upon a trailer where after body shaping elements have been inflated and they appear as when looking forward at the rear of the trailer. This figure shows the structural frame in phantom behind the inflated body elements.

Back to FIG. 15, FIG. 15 provides a sectional view through the present invention when inflated taken along the plane indicated by line 15-15 of previous FIG. 14. This figure shows the preferred embodiment of the multiple inflatable elements with one element 44 placed outwardly of the remaining elements 43. The inflatable elements impose tension upon overlaid cover skin that forms the aerodynamic shape desired for this invention. This figure also shows elastic members 51 that guide the inflatable elements and the cover skin to a controlled position during inflation and deflation of the invention.

FIG. 16 is a partial sectional view through the inflated after body along a plane indicated by line 16-16 of previous FIG. 14. This figure shows an inflatable element 43 beneath cover skin 42 and resting upon fixed attachment 64 that connects the element to the structural frame.

FIG. 17 is a sectional view at a larger scale taken along a plane indicated by line 17-17 of previous FIG. 15. This figure depicts the present invention showing a preferred continuous attachment of the cover skin to the structural frame. The cover skin has tension along its entire attachment to the structural frame from inflation of the elements between the cover skin and the frame.

Figure 18:
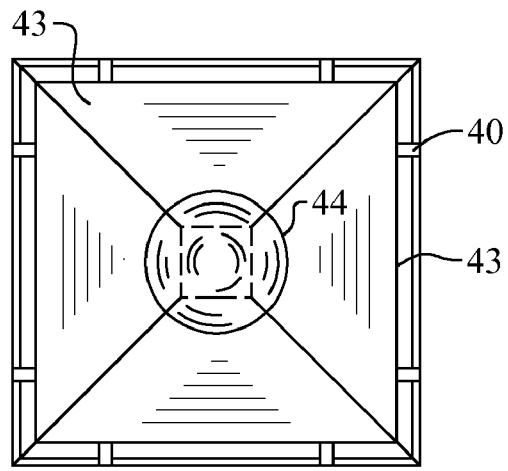

FIG. 18 is a front view of the invention, similar to FIG. 14, with the cover skin removed and revealing the inflatable elements 43. The major inflatable element has cylinders with mitered corners formed into a square shape as shown and surmounted by a somewhat round element 44 shown centered at the apex of the major inflatable element.

The present invention deploys upon a vehicle, primarily a trailer, having a side parallel to a direction of motion of the vehicle and a rear perpendicular to the direction of motion. The present invention has a rigid frame, generally rectangular with four edges that define a perimeter. The frame has at least one hinged connection upon one of the edges that attaches the rigid frame to the vehicle. The frame has two configurations during usage: a deployed configuration when adjacent to the rear of the vehicle and a stowed configuration when adjacent to the side of the vehicle. Upon the frame, the invention has at least one inflatable element that extends outwardly from the frame when in the deployed configuration and the element connects to the frame by adhesives or contracting members such as elastic cords. Overlying the inflatable element, the invention has a flexible member, or skin or cover. The cover has its perimeter and the cover secures to the frame upon its perimeter. The invention also has a pump system in communication with the at least one inflatable element that supplies air for inflation of the element and removes air for its deflation. The pump system operates upon electricity or compressed air and has various controls that allow for its remote operation, that is, from the cab of a truck hauling the trailer, well away from the rear of the trailer where the invention is installed.

The inflatable element shapes the overlying flexible member when inflated into an aerodynamically efficient shape which places the flexible member into tension on the frame. The flexible member attains a predetermined shape outwardly from the frame upon its inflation that the aerodynamic shape of the vehicle to reduce drag caused by turbulence behind the trailer.

In its preferred form, the invention includes one major inflatable element, locating proximate to all of the edges of the frame and one minor inflatable element surmounting the major inflatable element. The minor element is outward from the center of the major element and from the center of the frame. The minor element though is smaller than the major inflatable element. The minor inflatable element and the major inflatable element cooperate, when inflated by the pump system, to extend the flexible member to form the inflatable shaping system into an aerodynamic shape. To also maintain its shape, the flexible member has a continuous connection to the perimeter of the frame. The flexible member connects all around all of the edges of the frame which prevents intrusion of air, insects, and precipitation beneath it upon inflation of the minor and major elements.

The rigid frame connects to the trailer upon at least one hinge. Each hinge has two mounting fittings, a first hinge pin, a second hinge pin, and one connecting link. One of the fittings attaches to the rigid frame and the other fitting attaches to the side of the vehicle, typically to the side of door outwardly of the existing door hinges. The first hinge pin links the connecting link to one of the fittings, and the second hinge pin links the other end of the connecting link to the other fitting.

In usage, each of the hinges has a double acting mechanism. The mechanism first rotates the rigid frame from a locked configuration upon the rear of the vehicle through approximately ninety degrees upon the first hinge pin to generally parallel to the length of the vehicle outwardly from the rear of the vehicle. Then the mechanism performs its second, or double, action rotating the rigid frame from parallel to the length of the vehicle and outwardly from the rear of the vehicle through approximately one hundred eighty degrees to generally parallel to the length of the vehicle, along the side of the vehicle, and inwardly from the rear of the vehicle. The double acting mechanism advances the frame forward on the vehicle upon each of the connecting links. The double acting mechanism guides the inflatable shaping system to attain the stowed configuration with minimal interference with vehicle operations, such as loading and unloading.

From the aforementioned description, an inflatable shaping system reducing the aerodynamic drag upon the rear of a vehicle has been described. The inflatable shaping system is uniquely capable of inflating and deflating elements upon a frame beneath a cover skin to alter the airflow over the rear of is a vehicle, primarily a trailer to save fuel. The inflatable shaping system has one inflatable element that forms a truncated pyramidal shape extending rearwardly from a trailer with a round inflatable element at the apex of the shape, a cover skin over the inflatable elements, and a frame supporting the inflatable elements and providing continuous attachment of the cover skin. The inflatable shaping system and its various components may be manufactured from many materials, including but not limited to, steel, aluminum, polymers, polyvinyl chloride, high density polyethylene, polypropylene, nylon, ferrous and non-ferrous metals, their alloys, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. An inflatable shaping system for a vehicle comprising:
a rigid frame, generally rectangular, adapted to attach to said vehicle;
at least one inflatable element upon said rigid frame;
a flexible member overlying said at least one inflatable element, having a perimeter, and securing to said rigid frame upon its perimeter;
said at least one inflatable element shaping said overlying flexible member upon inflation of said element, placing said flexible member into tension upon said frame; and,
said flexible member attaining a predetermined shape outwardly from said frame upon inflation of said element wherein said system improves the aerodynamic shape of the vehicle forming a rounded shape outwardly of said frame and lessening fuel consumption and wherein said system is adapted to absorb forces from a collision reducing the severity thereof.

2. The inflatable shaping system of claim 1 further comprising:
- a pump system supplying and withdrawing air to said at least one inflatable element, said pump system being controlled by an operator of the vehicle;
- said flexible member and said at least one inflatable element collapsing upon said frame, wherein withdrawal of air from said at least one inflatable element deflates said at least one inflatable element and said cover compresses upon said frame attaining a flat thin configuration;
- wherein said flexible member covers said at least one inflatable member preventing damage thereto;
- said frame hingedly swinging approximately 270° to a stowed configuration against the side of the vehicle wherein said vehicle is then loading and unloaded at the destination of the vehicle, wherein said at least one inflatable element and said cover store upon said frame when the vehicle is in motion;
- wherein said inflatable shaping system when in said stowed configuration between said frame and the side of the vehicle avoids weather and road debris; and,
- wherein said inflatable shaping system saves time upon arrival of the vehicle at its destination.

3. The inflatable shaping system of claim 2 further comprising:
- said at least one inflatable element and said flexible member being deflated upon said frame;
- said frame being controlled by an operator of the vehicle wherein said frame rotates upon the rear of the vehicle with said at least one inflatable element and said flexible member remaining deflated;
- wherein said inflatable shaping system allows inflation and deflation of said element when the vehicle moves.

4. The inflatable shaping system of claim 2 further comprising:
- said pump system is adapted to permanently install upon the vehicle and is adapted to draw electrical power from the vehicle;
- said pump system automatically maintaining suitable pressure within said at least one inflatable element by remote control of a driver of the vehicle;
- said pump system having one of electrical or pneumatic controls and a microprocessor; and,
- said pump system being remotely operated, away from the location of installation of said inflatable shaping system.

5. The inflatable shaping system of claim 2 further comprising:
- said rigid frame having a height and width similar to that of the vehicle;
- said rigid frame having two sides, one side having a hinged connection to the vehicle and the other side having a latching connection to said vehicle away from the hinged connection; and,
- said rigid frame latching to the side of the vehicle when stowed and said rigid frame latching to the rear of the vehicle when in use.

6. The inflatable shaping system of claim 5 further comprising:
- said rigid frame having a perimeter, at least one edging member upon the perimeter of said rigid frame, and a continuous clamping strip, said clamping strip securing said flexible member upon the perimeter of said rigid frame, and an extension generally perpendicular to said rigid frame wherein said extension separates said frame from an adjacent vehicle;
- said flexible member attaching to said at least one edging member continuously upon the perimeter of said rigid frame;
- wherein each inflatable element remains interposed between said rigid frame and said flexible member.

7. The inflatable shaping system of claim 2 further comprising:
- said rigid frame having at least one hinge adapted to connect said rigid frame to an adjacent vehicle;
- said at least one hinge having a double acting mechanism;
- each of said at least one hinge having two mounting fittings, a first hinge pin, a second hinge pin, and one connecting link;
- wherein said double acting mechanism first rotates said rigid frame from a locked configuration upon the rear of the vehicle through ninety degrees upon said first hinge pin so that said rigid frame is generally parallel to the length of the vehicle and extends rearwardly from the vehicle;
- said first hinge pin connecting said rigid frame to said connecting link;
- wherein said double acting mechanism second rotates said frame from parallel to the length of the vehicle and rearwardly from the vehicle through one hundred eighty degrees so that said rigid frame is generally parallel to the length of the vehicle, along the side of the vehicle and forwardly, said double acting mechanism advancing said frame forwardly along the vehicle thus minimizing interference with vehicle operations, and thus said inflatable shaping system attains said stowed configuration.

8. An inflatable shaping system for a vehicle having a side parallel to a direction of motion and a rear perpendicular to the direction of motion, comprising:
- a rigid frame, generally rectangular with four edges, having a perimeter and at least one hinged connection upon one of said edges, said rigid frame adapted to attach to said vehicle, said rigid frame having a deployed configuration when adjacent to the rear of the vehicle and a stowed configuration when adjacent to the side of the vehicle;
- at least one inflatable element upon said rigid frame, said at least one inflatable element extending outwardly from said frame when in said deployed configuration, said at least one inflatable element connecting to said frame using one of adhesive or contracting members;
- said at least one inflatable element including one major inflatable element, locating proximate said edges of said frame;
- one minor inflatable element surmounting said major inflatable element outwardly from said rigid frame, said minor inflatable element being smaller than said major inflatable element;
- said minor inflatable element and said major inflatable elements cooperating in extending said flexible member thus forming said inflatable shaping system into an aerodynamic shape upon inflation of said minor inflatable element and said major inflatable elements by said pump system;
- a flexible member overlying said at least one inflatable element, having a perimeter, and securing to said rigid frame upon its perimeter;
- said flexible member having a continuous connection to the perimeter of said frame wherein thus preventing intrusion of the atmosphere beneath said flexible member upon inflation of said minor inflatable element and said major inflatable elements;

a pump system in communication with said at least one inflatable element, said pump system supplying air for inflation of said element and removing air for deflation of said element, said pump system operating upon one of electricity or compressed air, wherein said pump system is remotely controlled away from said inflatable shaping system;

said at least one inflatable element shaping said overlying flexible member upon inflation of said element, placing said flexible member into tension upon said frame;

said flexible member attaining a predetermined shape outwardly from said frame upon inflation of said element wherein said system alters the aerodynamic shape of the vehicle.

9. The inflatable shaping system of claim 8 further comprising:

said rigid frame having at least one hinge, adapted to connect said rigid frame to an adjacent vehicle;

each of said hinges having two mounting fittings, a first hinge pin, a second hinge pin, and one connecting link, one of said fittings attaching to said rigid frame and the other of said fittings adapted to attach to said vehicle, said first hinge pin linking said connecting link to one of said fittings, and said second hinge pin linking said connecting link to the other of said fittings;

each of said hinges having a double acting mechanism first rotating said rigid frame from a locked configuration upon the rear of the vehicle through approximately ninety degrees upon said first hinge pin to generally parallel to the length of the vehicle rearwardly, and second rotating said rigid frame from parallel to the length of the vehicle and rearwardly through approximately one hundred eighty degrees to generally parallel to the length of the vehicle, along the side of the vehicle, and forwardly along the vehicle, said double acting mechanism advancing said frame inwardly from the rear of the vehicle upon each of said connecting links, thus said inflatable shaping system attains said stowed configuration wherein said inflatable shaping system minimizes interference with vehicle operations.

* * * * *